No. 622,954. Patented Apr. 11, 1899.
S. T. JOHNSON.
CIRCULAR SHINGLE SAW.
(Application filed Dec. 28, 1898.)
(No Model.)
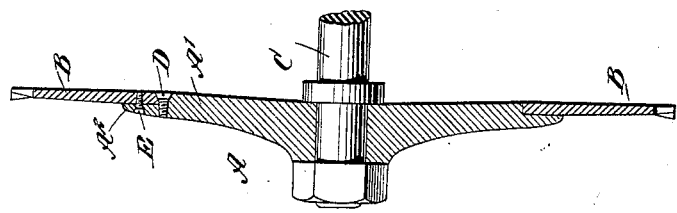
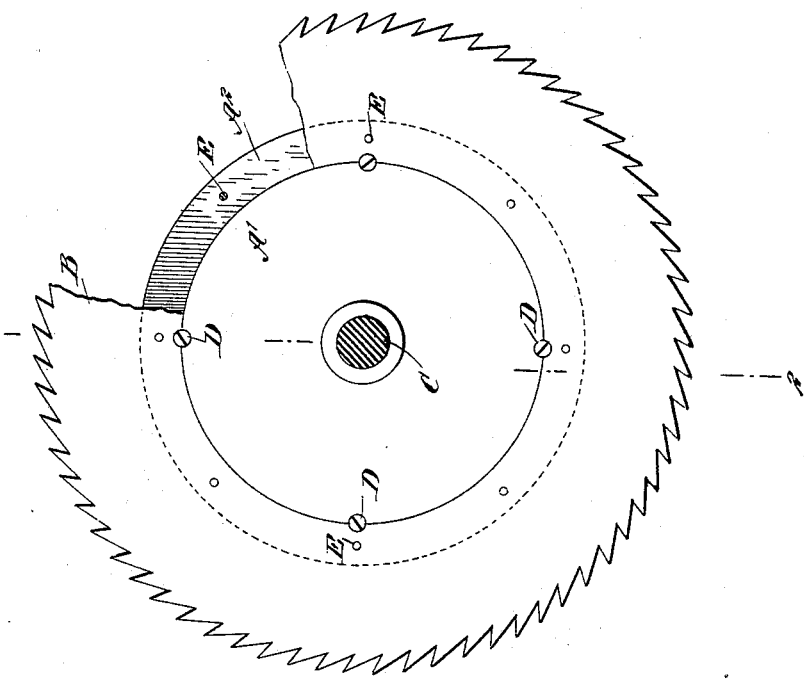
WITNESSES:
INVENTOR
Sieve T. Johnson.
BY
ATTORNEYS.

UNITED STATES PATENT OFFICE.

SIEVE THEODOR JOHNSON, OF TRINIDAD, CALIFORNIA.

CIRCULAR SHINGLE-SAW.

SPECIFICATION forming part of Letters Patent No. 622,954, dated April 11, 1899.

Application filed December 28, 1898. Serial No. 700,513. (No model.)

*To all whom it may concern:*

Be it known that I, SIEVE THEODOR JOHNSON, of Trinidad, in the county of Humboldt and State of California, have invented a new and Improved Circular Shingle-Saw, of which the following is a full, clear, and exact description.

My invention relates to circular saws such as shown and described in the Letters Patent of the United States No. 614,053, issued to me on November 8, 1898.

The object of the present invention is to provide a new and improved circular saw more especially designed for sawing shingles or the like and arranged to permit convenient removal of a broken or worn-out saw-blade and a replacing thereof by a new one.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in both the views.

Figure 1 is a face view of the improvement with part of the outer cutting-section broken away, and Fig. 2 is a cross-section of the same on the line 2 2 in Fig. 1.

The improved circular saw is provided with a central section A and a rim or cutting section B, of which the former is secured by suitable means to a spindle or arbor C, and the outer rim-section B is made ring-shaped, with teeth at the peripheral edge, as is plainly indicated in the drawings. The central section A is formed with an annular boss A', upon which snugly fits the ring or rim section B, and from the section A extends radially an annular flange A², on which rests a portion of the inner face of the outer rim-section B, as is plainly indicated in Fig. 2. The boss A' is of a depth corresponding to the thickness of the rim-section B at the inner edge thereof, so that when the section B is in position on the boss A' and rests against the flange A² then the outer face of the section B is flush with the outer edge of the central section A. The boss A' is dished or curved inwardly at the outer face from the peripheral edge to the arbor or the central hole in the section A, as is plainly indicated in Fig. 2, so as to prevent the material from rubbing against the boss while the saw is in use.

In order to fasten the rim-section B securely in place on the central section A, I provide screws D, screwing in the central section, a part of the shank and head of said screws engaging correspondingly-shaped recesses in the section B, at the inner edge thereof, as will be readily understood by reference to the drawings. By this arrangement the outer section B is prevented from turning on the boss A' and at the same time is prevented from slipping off the boss in a transverse direction, as the heads of the screws D engage the outer faces of the section B and the boss A'. Screws or rivets E pass through the flange A² and screw into correspondingly-threaded apertures formed in the rim-section B, so as to assist in holding the section B against turning on the central section A.

When it is desired to remove a worn-out or broken rim-section B, it is only necessary to remove the screws D and E and then lift the rim-section from the boss A'. A new rim-section can now be readily placed in position on the boss, resting against the flange and engaged by the screws E, after which the screws D are replaced to securely fasten the two sections together.

Having thus fully described my invention, I claim as new and desire to secure by Letters Patent—

1. A circular saw, comprising a central section having a boss and a flange projected outwardly beyond the boss, a rim-section having teeth at its outer periphery and transverse, substantially semicylindrical recesses in its inner periphery, and securing devices such as screws, extending through the boss and in the said recesses of the rim-section.

2. A circular saw, comprising a central section having a boss and a flange projected outwardly beyond the boss, said boss being provided at its outer periphery, where it joins the flange, with substantially semicylindrical recesses and with cylindrical through-apertures located in the continuation of said recesses, a rim-section having teeth at its outer periphery and transverse substantially semicylindrical recesses at its inner periphery and in positions corresponding to the recesses of the boss, and securing devices, such as screws, extending in the through-apertures of the boss and in the mating recesses of the boss and rim-section.

3. A circular saw, comprising a substantially plane annular rim-section provided with teeth, a central section dished inwardly with respect to the plane of the rim-section, and means for fastening the rim-section to the central section.

SIEVE THEODOR JOHNSON.

Witnesses:
PETER BELCHER,
G. R. GEORGESON.